Figure 1:
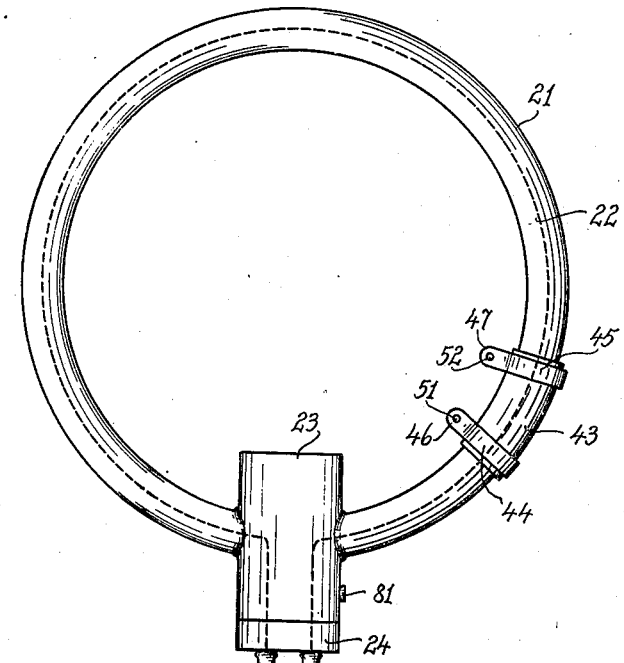

May 16, 1944.　　W. G. H. FINCH ET AL　　2,349,154
COAXIAL CABLE LOOP ANTENNA
Filed Aug. 13, 1941

INVENTOR
William G. H. Finch and
James M. Wakefield
BY
ATTORNEY.

Patented May 16, 1944

2,349,154

UNITED STATES PATENT OFFICE 2,349,154

COAXIAL CABLE LOOP ANTENNA

William G. H. Finch, Newtown, Conn., and James M. Wakefield, Waldwick, N. J., assignors to Finch Telecommunications, Inc., Passaic, N. J., a corporation of Delaware Application August 13, 1941, Serial No. 406,576

2 Claims. (Cl. 250—33)

Our invention relates in general to antennae, and more particularly concerns a novel and high efficiency loop of the type normally employed for direction finding apparatus.

A loop antenna, as is well known, has desirable directional characteristics and is therefore ordinarily employed in radio direction finding equipment to determine the bearing of a transmitter.

The loop may comprise a plurality of turns of wire, the terminals of which are suitably joined to a tuning condenser or tuning circuit. The problem of loop construction is not particularly formidable if the loop is to be utilized at normal broadcast frequencies; that is, of the order of one thousand kilocycles per second, since leakage of high frequency alternating current across insulating material is not present to great extent.

Thus it is possible to fabricate a loop by employing a circular Bakelite form and winding a number of turns thereupon. An ordinary loop will, if employed in direction finding apparatus, introduce certain errors into the determination of the bearing. Thus it is well understood that false bearings may be obtained unless the loop is electrostatically balanced with respect to ground potential.

Unbalance may be minimized if symmetrical circuit arrangements are utilized with the loop. However, the most efficient method of balancing the loop with respect to ground is by the application of an electrostatic shield. This shield may comprise a cylindrical metal enclosure curved to the form of the loop itself. This metal therefore forms a housing for the loop and if grounded insures that all parts of the loop will have the same capacity with respect to ground, and will remain thus irrespective of neighbouring metallic objects of the orientation of the loop.

This housing must necessarily be broken by an insulating bushing in order that the shield does not act as a closed or short-circuited turn.

As disclosed in copending application Serial No. 377,436, filed February 5, 1941, of Thomas S. Leaser, Patent No. 2,263,972, dated Nov. 25, 1941, the loop may be fabricated upon a flat Bakelite strip and the electrostatic shield may comprise an aluminum cylindrical housing. The upper portion of this housing is open circuited to preclude the aforementioned short circuit effect and the shield is grounded. As disclosed in the aforementioned application, the aluminum housing is a cast or otherwise fabricated metallic cylinder curved to fit the loop itself.

It is obvious that the fabrication of such a loop involves a number of stages and due to the fact that aluminum is a material relatively difficult to handle, may involve considerable expense.

Furthermore, at frequencies of the order to twenty-five megacycles per second, it would be highly impractical to utilize the flat Bakelite coil form for the loop itself. This is true since at such ultra-high frequencies, the leakage across ordinary insulators is excessive and reduces the Q of the loop considerably.

The Q of a coil is, as is well known, an index of the efficiency of the coil in so far as leakage or resistance losses are concerned.

For accurate direction finding apparatus, the Q of a coil should be as high as is feasible and thus the very best insulating material should be employed in conjunction therewith.

It is evident that at the ultra-high frequencies, the inductance of the loop required for proper reception of the signal is extremely low and thus since the inductance of a coil varies substantially as the square of the number of turns, the number of turns will be very small. In fact, a loop which may cover the ultra-high frequency range may normally have no more than a single or two turns of wire.

In fabricating such a loop in the manner described in the aforementioned copending application, a flat Bakelite strip would be inserted into an electrostatic copper shield comprising a metallic housing. An operator on the loop winding machine would then wind the necessary one or two turns upon the Bakelite form to complete the loop.

Our invention contemplates a loop and a method for fabricating the same which is extremely efficient insofar as economy in manufacture and losses of an electrical nature are concerned.

More specifically, we have discovered that we may fabricate a loop for direction finding or similar apparatus from commercially available, preformed, coaxial cable which will provide a completed loop of an exceptionally high Q and which may be manufactured with a minimum of difficulty.

Commercial coaxial cable, as is well known, comprises essentially a central conductor and an outer shield concentrically spaced therefrom by a plurality of equi-distantly spaced insulating washers or the like. Since a relatively small amount of insulation is required with such a cable, good quality insulation may be utilized at a relatively low cost. Thus, for instance, if polystyrene beads are utilized, the losses within this type of cable will be comparatively low due to leakage across the surface thereof.

In the fabrication of a loop from this type of cable, we first cut off a section of the cable of the proper length and then bend it into the form of a loop with any conventional tube bending apparatus. The ends of the center conductor are then coupled through a suitable supporting member to the various tuned circuits or a plurality of prongs so that the loop may be used on a plug-in arrangement.

The outer conductor which now comprises the shield of my novel loop antenna is grounded and in order to prevent the shield from acting as a short-circuited turn to preclude the reception of signals, I remove a section of the outer conductor at one portion of the loop so as to introduce an air gap in the shield.

This method described, of course, indicates that the loop will have only one turn. However, as previously mentioned, one turn is sufficient for loops required for the ultra-high frequency range. The Q of such a loop is extremely high inasmuch as relatively little insulating material of a solid nature is utilized to space the center wire and the outer shield.

Insulation such as polystyrene beads results in a very low loss loop. Furthermore, it should be noted that the remainder of the insulation between the central wire and the outer shield is air which comprises an excellent dielectric and the losses even at extremely high frequencies are relatively low.

It is therefore an object of our invention to provide for a relatively efficient novel loop antenna.

A further object of our invention is to provide for a loop of extremely high Q formed from preformed shielded wire.

A still further object of our invention is to provide for a loop for use in connection with direction finding equipment fabricated from coaxial cable of a commercially available type having a central conductor spaced from an outer conducting shield by a plurality of insulating beads disposed along the central conductor.

Another object of our invention is to provide an electrostatically balanced loop utilizing coaxial cable bent to the proper form and having the outer shield thereof broken at one point to provide an insulating air gap.

Figure 2:
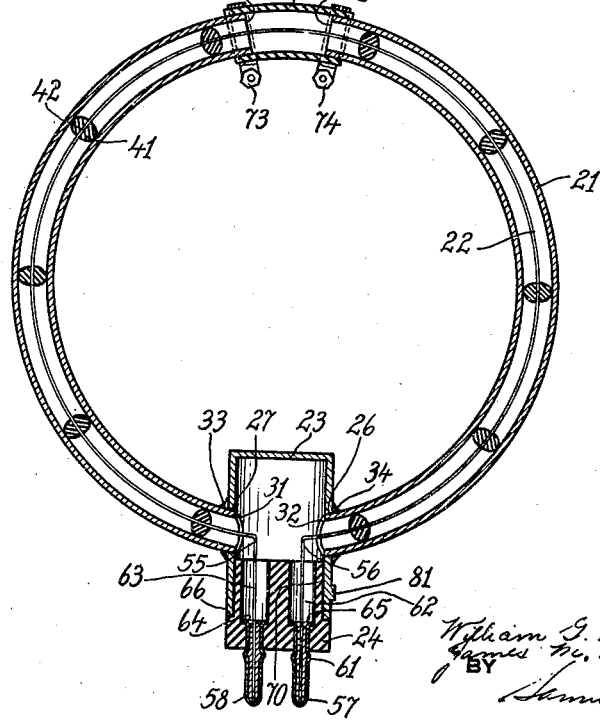

These and other objects of our invention will now become apparent from the following specification taken in connection with the accompanying drawing, in which:

Figure 1 is a plan view of our novel loop in one phase of the construction thereof; and Figure 2 is a cross-sectional view of the loop illustrated in Figure 1 showing the completed construction and the electrical connections thereof.

In the fabrication of the loop illustrated in Figures 1 and 2, the diameter thereof is first predetermined to meet the particular application thereof.

If the loop is to be circular, the perimeter thereof is then determined and a corresponding length of coaxial cable is obtained.

The coaxial cable required may be several inches greater than the actual perimeter of the coil for reasons which will be explained in a later paragraph.

The cable is then bent in any suitable manner to a circular loop of the proper diameter as illustrated in the figures. Coaxial cable is normally obtained in the form of hollow copper tubing having a central parallel wire suitably supported therein.

There are various known methods for bending copper tubing into circular forms and coils, for application other than that disclosed. Thus it is well known that machines may be obtained for bending copper tubing for use in connection with boiler heating coils and the like. Many of these machines are of relatively simple construction and thus may be inexpensively applied to the present needs for loops.

Accordingly, as illustrated in Figure 1, a loop of copper coaxial cable is formed having an outer shield 21 and an inner concentric conductor 22 suitably spaced from the outer conductor.

Since the loop is normally utilized in connection with radio direction finding application wherein a series of interchangeable loops are desirable, our novel loop is mounted upon an adapter which permits the adaptation of this loop to conventional receptacles.

A metallic cup 23 is utilized to support the loop by securing the ends thereof. The cup 23 is in turn supported upon an insulating member 24 which may preferably have a plurality of connecting prongs 25 extending therefrom.

In Figure 1, our novel loop antenna is shown in one phase of the construction thereof. Thus the entire coaxial cable has been bent to form a single turn and is joined to the supporting member 23. Actually in the construction of shielded loops, it is necessary to insert an insulated junction in the outer shield 21 in order to preclude the action of the shield as a short circuited turn.

Thus after the loop is assembled as illustrated in Figure 1, a section of the outer cylindrical conductor 22 may be removed to expose the inner wire. This accordingly open circuits the outer shield.

Referring now to Figure 2, the assembled loop is shown in cross section. In order to provide a rigid support for the loop, the cup 23 is perforated at 26 and 27 which perforations are axially aligned.

The ends 31 and 32 of the outer conductor 21 of the coaxial cable utilized for the loop are inserted into the openings 27 and 26 respectively and are suitably fastened therein.

As illustrated in Figures 1 and 2, the outer conductor may be fastened to the supporting member 23 by soldering the junctions 33 and 34. This serves the dual purpose of securing the outer conductor of the coaxial cable to the cup 23 and precluding the entry of moisture or other foreign particles into the hollow cylindrical conductor.

The inner conductor of a coaxial cable is normally a highly conductive wire, such as copper, and is centrally supported therein by means of a plurality of regularly spaced insulating means or the like.

These insulating members as is well known in the art of constructing coaxial cable, are supported upon the central conductor during the fabrication thereof, and the outer concentric conductor is secured thereover.

The spacing between the inner insulating members will be determined by the particular application of the coaxial cable purchased.

The insulators utilized to centralize the inner conductor and insulatedly space it from the outer conductor are normally of an extremely low-loss, high-dielectric material. In selecting the particular dielectric material to be utilized, it is important to consider that at ultra-high frequencies, the losses in dielectrics are normally due to conduction across the surface thereof, and not conduction throughout the volume. Thus it is necessary to select the dielectric material having a particularly low surface leakage coefficient.

As is well known, coaxial cables may be purchased rolled upon reels and are constructed so that the curvature thereof normally has no effect upon the spacing between inner and outer conductors, and normally does not affect the position of the insulating members.

As illustrated in Figure 2, the insulating members comprise beads or the like 41, suitably perforated at 42 and supported upon the inner conductor in the well known manner. The insulating beads 41 are normally press-fitted upon the inner conductor and thus lateral motion thereof is avoided. Immediately subsequent to the bending of the coaxial cable in to form a loop as illustrated in Figures 1 and 2 and immediately prior to the insertion into the perforation 26, 27 of the cup 23, an insulating sleeve 43 is slipped over the outer conductor 21. The sleeve may be fabricated from a suitable insulating material and has a curvature which equals that of the loop and an inner diameter which corresponds substantially to the outer diameter of the coaxial cable utilized for the loop. The material used for the sleeve 43 must be of extremely low-loss since a poor insulator would effectively short circuit the opening in the outer conductor of the cable at high frequencies. A suitable insulator for these high frequencies may for example be polymerized styrene which in liquid form may be applied in several coats to a sleeve 43. The insulating support 23 is preferably of a similar material.

The pair of ring clamping members 44 and 45 are suitably positioned upon the insulating sleeve 43 as illustrated in Figures 1 and 2 and comprise bands of metal having lugs 46 and 47 extending from each end thereof. These lugs are perforated at 51 and 52 and a pair of bolts and nuts are utilized to cause these clamping members 44 and 45 to bear tightly against the sleeve 43.

In the fabrication of the loop the sleeve 43 is permitted to remain free upon the outer conductor 21 and the clamping bolts and nuts to be described are not used until the loop is completed as indicated in Figure 2.

The length of coaxial cable required to fabricate the loop is greater actually than the circumference of the circular loop itself, since it is necessary to provide extensions of the inner conductor to join the loop to a suitable radio circuit.

To this end, we use a length of coaxial cable which is somewhat greater than the circumference of the loop, and remove a section of the outer concentric shield at each end thereof to provide the extensions 55 and 56 of the inner conductor which are suitable for joining into an associated circuit.

As previously mentioned, the member 23, which is preferably of metal, is used to support the outer shield 21 of the loop.

The member 23 is supported upon a suitable insulating post 24 as previously described which, as indicated in Figures 1 and 2, provides the extending prongs 57 and 58 for joining to a suitable corresponding receptacle. The prongs 57 and 58 may be formed in a well known manner and may comprise hollow cylindrical members having a position circular flange 61 and may be inserted into corresponding cylindrical openings 62 and 63 within the insulating member 24.

The upper ends 64 and 65 are flared by a suitable punch so that the prongs 57 and 58 remain positioned within the insulating support 24.

The shoulder 66 is cut into the insulating member 24 so that it may be press fitted at 70 in the metallic supporting member 23, as illustrated in Figure 2.

During the construction of the loop, the ends 31 and 32 are inserted into the corresponding openings 27 and 26. The extensions 55 and 56 of the inner conductor are brought through the supporting member 23 and through the passages 62 and 63 of the insulator 24 and are inserted into the prongs 58 and 57.

The ends of the inner conductor are then suitably secured to the prongs 57 and 58 as by soldering.

As previously mentioned, it is essential to preclude the action of the shield as a short-circuited turn to prevent the reception of a signal by the inner conductor. It is accordingly necessary to break the shield and insert an insulating support therefor.

As indicated in Figure 2, the upper end of the outer concentric shield has been cut and a section thereof removed to expose the ends 71 and 72 thereof. However, it is important to note that the inner conductor has not been damaged in any manner.

Since normally a loop antenna of the type illustrated is utilized for outdoor work, the insulating sleeve 43 is slipped over the opening in the outer shield between the ends 71 and 72 and the clamping members 44 and 45 are rigidly secured thereto.

This is accomplished by tightening the nuts and bolts 73 and 74 so that the clamps bring the insulating member 43 to bear in a manner which precludes the entry of moisture and other foreign substances.

It is well known in the art of radio direction finding loop antennae, that a shielded loop may be formed by opening the shield at any point. However, it is essential to have a balanced loop for proper radio direction finding equipment and thus the shield is normally opened at a point symmetrically disposed with respect to the ends thereof. However, it is possible to open the shield at the lower end thereof. This may be accomplished in a most expeditious manner since it is merely necessary to form the supporting member 23 of an insulating material and join the ends of the loop 31 and 32 thereto in any suitable manner. It is thus possible to fabricate a balanced shielded loop without introducing the operation of cutting the outer coaxial shield at 71 and 72 as illustrated in Figure 2.

If it is necessary to properly position the loop illustrated in Figure 2 within a corresponding receptacle, a locating pin 81 may be secured to the supporting member 23.

It will now be evident that the loop illustrated in Figures 1 and 2 comprises merely a single turn shielded to preclude deleterious effects of nearby metallic objects and other interfering signals as has been described. Since the inductance of a one-turn loop is extremely small, the loop indicated is particularly adaptable to the reception of ultra-high frequency signals.

For this application, the loop illustrated is particularly efficient since the insulating beads 41 normally inserted into coaxial cable are of low-loss material. Furthermore, as will be noted the inner conductor and the outer concentric shield are practically spaced entirely by air which as is well known forms an extremely suitable dielectric medium for such purposes. The actual number of insulating washers 41 used to separate inner and outer conductors will be determined by the particular type of insulating material employed, the type of coaxial cable used, and the diameter of the loop to be formed.

The method illustrated and described for fabricating single turn shielded loops may be extended readily to loops having several turns. Thus it is merely necessary to form a coil of a number of turns of coaxial cable and open-circuit the outer concentric conductor 21 at one point in each turn thereof. The ends of the coaxial cable used for the coil may then be brought to a support similar to that illustrated in connection with Figures 1 and 2. This support which may be similar to the members 23 and 24 will serve to support the turns of the loop in a fixed space relation and to carry the prongs for joining into another circuit.

Also, commercially available coaxial cable having a number of strands within an outer sheath may be employed. These strands are insulated from each other by spaces as in the single strand cable. By suitably interconnecting the ends of the strands within the sheath a loop antenna having a plurality of turns may be formed. A section of the sheath may be cut away, and a base provided.

Inasmuch as we have described and illustrated only one modification of a loop antenna for radio direction finding, many other variations thereof will now be present to those skilled in the art.

Therefore, we prefer not to be bound by the specific disclosures hereinabove set forth, but only by the spirit and scope of the appended claims.

We claim:

1. A shielded loop antenna comprising a preformed wire, said wire having an inner conductor and an outer cylindrical metallic hollow circular shield, equidistantly spaced insulation washers for supporting said inner conductor concentrically with respect to said outer conductor, a metallic cup for supporting said shield having concentric perforations at its sides for securing the ends of said shield and through which the ends of the inner conductor pass into said cup, an insulation cap for closing said cup and having conductor prongs embedded therein, said ends of said inner conductor being secured to said conductor prongs.

2. The method of fabricating a loop antenna comprising the steps of bending a predetermined length of preformed coaxial shielded cable having an inner conductor mounted by disk insulators in air spaced relation in an outer conductive shield and constructed so that the curvature thereof has no effect upon the spacing between inner and outer conductors and does not affect the position of the insulating washers, positioning an insulating sleeve upon said shield, securing the ends of said shield to a supporting member, removing a section of said cable shield at a point symmetrically disposed with respect to the ends of said shield, and joining the ends of said inner conductor to a connector.

WILLIAM G. H. FINCH.
JAMES M. WAKEFIELD.